Patented Dec. 23, 1952

2,623,024

UNITED STATES PATENT OFFICE 2,623,024

METHOD OF MAKING MIXTURES OF RUBBERY BUTADIENE-STYRENE COPOLYMER, HEVEA RUBBER, AND CARBON BLACK

Bernard C. Barton, Clifton, N. J., assignor to United States Rubber Company, New York, N. Y., a corporation of New Jersey No Drawing. Application May 31, 1951, Serial No. 229,287

2 Claims. (Cl. 260—5)

This invention relates to mixtures of rubbery butadiene-styrene copolymer (GR-S), natural rubber, i. e., Hevea rubber, and carbon black. More particularly, this invention relates to an improved method of combining these three ingredients in such a manner as to secure better processing properties, particularly lessened shrinkage and roughness upon calendering or extrusion of the mixture.

This application is a continuation-in-part of my co-pending application Serial No. 85,989, filed April 7, 1949, now abandoned.

Ever since GR-S became available, it has been common practice to blend it with natural rubber, i. e., Hevea rubber, in order to secure certain advantages which could not otherwise be obtained. The resulting blends have commonly been used wherever natural rubber was formerly employed, and this customarily includes the admixture of reinforcing types of carbon black with the blends so as to obtain the well-known advantages attributable to the use of carbon black in rubber formulations.

One method which has been employed generally for making the mixture of GR-S, natural rubber, and carbon black is the normal and obvious one involving first masticating the GR-S and the natural rubber together in the usual way to obtain a uniform mixture and then admixing the carbon black with the resulting blend and masticating until the carbon black is well mixed. This method is subject to the disadvantage that the completed mix upon being calendered or extruded is likely to be rough and to exhibit undue shrinkage. Another commercial method is to blend the Hevea rubber with a black masterbatch of GR-S and carbon black as supplied by the manufacturer of the synthetic rubber, the black masterbatch having been made by adding carbon black to the synthetic rubber latex and coagulating the rubber and the carbon black simultaneously in known manner.

The principal object of the present invention is to provide an improved method of preparing mixtures of GR-S, Hevea rubber, and carbon black. Another object is to provide such a method which gives a mixture having substantially improved processing properties, as evidenced particularly by lessened shrinkage and roughness upon calendering or extrusion.

I have made the surprising and unexpected discovery that in the formulation of rubber compositions comprising rubbery butadiene-styrene copolymer (GR-S), Hevea rubber, and carbon black, greatly improved processing characteristics can be achieved by first masticating the carbon black with the rubbery butadiene-styrene copolymer in the absence of vulcanizing ingredients, or at least in the absence of sulfur, at temperatures substantially above 250° F., typically from 275° F. to 350° F., until the mixture is smooth, and thereafter cooling the mixture and blending it with the Hevea rubber and completing the incorporation of vulcanizing ingredients into the mixture by milling in the usual manner. Typically, I incorporate the Hevea rubber and the vulcanizing ingredients simultaneously by a quick milling which is completed before the temperature has risen materially above 250° F. The mastication of the GR-S and carbon black mixture at above 250° F. is followed by cooling to below 250° F. to allow incorporation of the vulcanizing ingredients. If desired, most but not all of the necessary compounding ingredients can be added along with the carbon black, saving the addition of the sulfur or sulfur and accelerator until the very last and carrying out such addition at a temperature substantially below 250° F. to avoid scorching or pre-vulcanization, in accordance with ordinary rubber compounding technique.

The vulcanizing ingredients comprise a vulcanizing agent, typically sulfur, and, if desired, a vulcanization accelerator and zinc oxide. The selection of the types and amounts of vulcanizing ingredients will be well within the skill of the art and constitutes no part of my invention.

In addition to vulcanizing ingredients, I usually employ other conventional compounding ingredients, such as antioxidants, and softeners or plasticizers such as rubber-softening oils, stearic acid, etc.

The various mastication steps employed in practicing my invention can be performed in an internal mixer such as a Banbury mixer, on an open two-roll rubber mill, or with any other type of equipment which exerts the desired kneading and grinding action.

The rubber compound obtained by proceeding in the foregoing way is shaped into the desired form and vulcanized in the conventional manner. It may be calendered or extruded as a part of the processing, its low shrinkage and reduced roughness upon calendering or extrusion being extremely advantageous.

Any type of carbon black commonly used for reinforcing rubber may be used in the practice of my invention, including both reinforcing and semi-reinforcing types. Generally, I use either channel black or furnace black. I prefer to admix all of the carbon black used in the final formulation with the GR-S and to process the mixture in the manner described above. However, in some cases where very high loadings of carbon black in the final mixture are desired, a major proportion of the carbon black may be processed with the GR-S according to my invention, and the balance of the carbon black may be introduced in a different manner, for example, by premastication with the natural rubber, or by addition either along with the natural rubber or after the natural rubber has been incorporated with the mixture obtained by my special processing of the GR-S and the major proportion of the carbon black. I have found that the maximum weight of carbon black which it is most convenient to premix with the GR-S according to my invention is an amount equal to the weight of the GR-S. Accordingly, if it is desired to formulate a final compounded rubber containing more carbon black than GR-S (by weight), an amount of carbon black equal to the weight of GR-S is premixed with the GR-S, and the Hevea rubber and the balance of the black are introduced subsequently.

The advantages of the present invention are obtained to the greatest extent when all of the carbon black is premixed with GR-S before intermixture with the natural rubber. As the proportion of carbon black introduced in a different manner increases, the advantages of the present invention are proportionately reduced. However, even when the amount of carbon black incorporated in a manner other than that of the present invention is as large as the amount premixed and heat-processed with the GR-S in accordance with my invention, the advantages in decreased shrinkage and roughness are sufficiently great to justify the use of my invention.

The relative proportions of GR-S and natural rubber used in the formulations of my invention may vary widely, but the GR-S commonly ranges from 40 to 60%, and the natural rubber correspondingly from 60 to 40%, of the combined weights of GR-S and natural rubber used.

The amount of carbon black can vary widely, but the greatest advantage is obtained when it ranges from 40 to 60% of the combined weights of the GR-S and the Hevea rubber.

Example

This example illustrates the process of my invention (mix b), in comparison with other processes at variance therewith, in producing smooth (low rugosity) calendered sheet from mixtures of Hevea rubber, GR-S and reinforcing carbon black. Six partial mixes are prepared according to the following formulations:

| Mix | a | b | c | d | e | f |
|---|---|---|---|---|---|---|
| Standard GR-S | 50 | 50 | 50 | 50 | | |
| Smoked sheet | | | 50 | 50 | 50 | 50 |
| Carbon Black (Wyex) | 50 | 50 | 50 | 50 | 50 | 50 |
| Softening Oil | 5 | 5 | 5 | 5 | 5 | 5 |
| Stearic acid | 1 | 1 | 1 | 1 | 1 | 1 |
| Antioxidant | 1 | | 1 | | 1 | |
| Zinc Oxide | 5 | | 5 | | 5 | |
| Accelerator [1] | 1 | | 1 | | 1 | |
| Sulfur | 2.5 | | 2.5 | | 2.5 | |

[1] Condensation product of cyclohexylamine and mercaptobenzothiazole.

It is to be noted that in mixes a and b the carbon black is first mixed with the GR-S, and that the Hevea is to be added later. In mixes c and d the black is mixed with both the GR-S and the Hevea from the start. In mixes e and f the black is first mixed with the Hevea, and the GR-S is to be added later. It is also to be noted that in mixes a, c, and e all of the vulcanizing and other ingredients, including the sulfur, are present from the start, whereas in the case of mixes b, d, and f the vulcanizing ingredients are to be added later, after the hot-milling step.

The mixes are prepared by masticating the above ingredients together at 275° F. in a Banbury internal mixer with a rotor speed of 50 R. P. M. With the exception of mix a, all mixes are masticated for ten minutes at 275° F. to insure thorough mixing of the ingredients. Mix a stiffens so much during the mixing operation that it must be dumped after six minutes. All batches are removed from the Banbury and given three passes through a cold two-roll rubber mill. With the exception of mix e, all mixes band on the mill to form more or less coherent sheets. Mix e will not form a coherent sheet but forms a crumb on the mill.

Mixes a, b, d, e and f are each placed in a Banbury mixer and either additional natural or synthetic rubbers and/or compounding ingredients including sulfur and vulcanization accelerators are added according to the following formulations:

| Mix | a | b | d | e | f |
|---|---|---|---|---|---|
| Smoked sheet | 50 | 50 | | | |
| GR-S | | | | 50 | 50 |
| Antioxidant | | 1 | 1 | | 1 |
| Zinc oxide | | 5 | 5 | | 5 |
| Accelerator | | 1 | 1 | | 1 |
| Sulfur | | 2.5 | 2.5 | | 2.5 |

The complete mixes are masticated four minutes in the Banbury at a temperature of 240° F. with a rotor speed of 50 R. P. M. At the conclusion of this mixing operation, calendered sheets are prepared from mixes a, b, d and f and from mix c. Mix c was not given the additional mastication at 240° F. because it was already well mixed. A calendered sheet cannot be made from mix e because it fails to knit together. The sheet made from mix a is too rough and broken to permit of its rugosity being measured. The roughness of the other sheets is measured by the rugosity test (using the rugosimeter of Mooney 2,417,988). The sheet prepared from mix b processed in accordance with my invention shows a low rugosity of 0.120 as compared to rugosities of 0.241, 0.285 and 0.808, respectively, for sheets from mixes c, d and f prepared by methods at variance with my invention.

The rugosity measurements just given indicate the great superiority of the process of my invention over comparative processes wherein the vulcanizing ingredients are added with the GR-S, or wherein the natural rubber is added initially with the GR-S, or wherein the natural rubber is added initially, the addition of the GR-S being reserved until after the hot milling step.

The unvulcanized mixtures made in accordance with my invention exhibit considerably lower shrinkage upon calendering or extrusion than do the other mixtures. Those measurements of calender shrinkage upon calendering at say 200° F., show that the reduction in calender shrinkage obtained by the practice of my invention is of a similar order of magnitude to the reduction in rugosity shown in the above example.

It is known that improvements in smoothness of calendered sheet rubber material made from mixtures of reinforcing carbon black with natural and synthetic rubbers can be made by employing relatively large amounts of softening agents and the like. Such improvements are often made at the expense of other physical properties such as tensile strength, elongation at break, abrasion and the like. A comparison of such physical properties for the vulcanizates prepared from the mixes processed in accordance with my invention shows that the improvement in smoothness obtained by my process is obtained without the sacrifice of any of their other physical properties.

Morris et al. (Ind. Eng. Chem., 36, 60–63 (1944)) disclose a method for the preparation of a mixture of 80 parts of GR–S, 20 parts of natural rubber and 50 parts of carbon black wherein a master batch of the GR–S and all of the compounding ingredients is first prepared on a cold mill after which the natural rubber is added on a warm mill. However, the authors give no indication of any advantage of this method over any other method, especially with respect to shrinkage and roughness upon calendering or extrusion of the mixtures. Moreover, the authors used GR–S containing all the vulcanizing ingredients, in their low-temperature process step. Such presence of the vulcanizing ingredients is wholly unsuitable, as is shown above, in a high-temperature milling process.

From the foregoing description it will be seen that the present invention provides a simple and economical method of securing great processing advantages in preparing mixtures of GR–S, natural rubber, and carbon black. The advantages of the present invention are obtained merely by employing a particular order of intermixture of the ingredients and milling temperature schedule, without the use of additional equipment and without reducing the productivity of existing equipment. The considerable advantages obtained by the present invention were unobvious and unexpected from a consideration of the work which had been done by prior workers in the art.

Having thus described my invention, what I claim and desire to protect by Letters Patent is:

1. A method of making a mixture of rubber and carbon black wherein the rubbery components comprise Hevea rubber and a rubbery butadiene-styrene copolymer, which comprises masticating the carbon black with said rubbery copolymer in the absence of vulcanizing agent at temperatures substantially above 250° F. until the components are well mixed, and thereafter masticating the resulting mixture with the Hevea rubber and completing the incorporation of vulcanizing ingredients by milling at temperatures below 250° F. until a uniform mixture is obtained.

2. A method of making a mixture of rubber and carbon black wherein the rubbery components comprise Hevea rubber and a rubbery butadiene-styrene copolymer in proportions corresponding to from 40 to 60% by weight of each, based on their sum, and wherein the amount of carbon black ranges from 40 to 60% of the sum of the weights of the rubbery components, which comprises masticating the carbon black with said rubbery copolymer in the absence of vulcanizing agent at temperatures substantially above 250° F. until the components are well mixed, and thereafter masticating the resulting mixture with the Hevea rubber until a uniform mixture is obtained and completing the incorporation of the vulcanizing ingredients by milling at temperatures below 250° F.

BERNARD C. BARTON.

REFERENCES CITED

The following references are of record in the file of this patent:

UNITED STATES PATENTS

| Number | Name | Date |
|---|---|---|
| 2,512,697 | Te Grotenhuis | June 27, 1950 |

OTHER REFERENCES

Vanderbilt—1942—Rubber Handbook—p. 27—pub. 1942 by R. T. Vanderbilt Co., N. Y.

Morris et al. (1) Ind. and Eng. Chem., January 1944—p. 60–63.

Morris et al. (2) India Rubber World, November 1943, p. 151.

Stubbs et al., Rubber Age—Aug. 1946, p. 567–569.